United States Patent
Preston et al.

(10) Patent No.: US 8,364,335 B1
(45) Date of Patent: Jan. 29, 2013

(54) METHOD AND APPARATUS FOR DYNAMIC CONFIGURATION OF MULTIPROCESSORS SYSTEM

(75) Inventors: Dan Alan Preston, Bainbridge Island, WA (US); Robert Pierce Lutter, Tacoma, WA (US)

(73) Assignee: Eagle Harbor Holdings, LLC, Bainbridge Island, WA (US)

( * ) Notice: Subject to any disclaimer, the term of this patent is extended or adjusted under 35 U.S.C. 154(b) by 0 days.

(21) Appl. No.: 13/188,959

(22) Filed: Jul. 22, 2011

Related U.S. Application Data

(63) Continuation of application No. 12/258,234, filed on Oct. 24, 2008, now Pat. No. 8,027,268, and a continuation of application No. 11/462,958, filed on Aug. 7, 2006, now Pat. No. 7,778,739, and a continuation of application No. 09/841,915, filed on Apr. 24, 2001, now Pat. No. 7,146,260.

(51) Int. Cl.
*G01C 22/00* (2006.01)

(52) U.S. Cl. .......................... 701/24; 701/33

(58) Field of Classification Search .................. 370/403, 370/410, 455, 465; 364/424.031; 455/569.1, 455/569.2
See application file for complete search history.

(56) References Cited

U.S. PATENT DOCUMENTS

| | | | |
|---|---|---|---|
| 2,995,318 A | 8/1961 | Cocharo | |
| 3,812,468 A | 5/1974 | Wollum et al. | |
| 4,303,978 A | 12/1981 | Shaw | |
| 4,528,563 A | 7/1985 | Takeuchi | |
| 4,558,460 A | 12/1985 | Tanaka | |
| 4,591,976 A | 5/1986 | Webber | |
| 4,735,274 A | 4/1988 | Good et al. | |
| 4,829,434 A | 5/1989 | Karmel | |
| 4,835,537 A | 5/1989 | Manion | |
| 4,907,159 A | 3/1990 | Mauge | |
| 4,931,930 A | 6/1990 | Shyu et al. | |
| 5,008,678 A | 4/1991 | Herman | |
| 5,027,432 A | 6/1991 | Skala | |
| 5,031,330 A | 7/1991 | Stuart | |
| 5,045,937 A | 9/1991 | Myrick | |
| 5,111,401 A | 5/1992 | Everett, Jr. | |
| 5,115,245 A | 5/1992 | Wen | |
| 5,243,640 A | 9/1993 | Hadley et al. | |
| 5,245,909 A | 9/1993 | Corrigan | |
| 5,287,199 A | 2/1994 | Zoccolillo | |
| 5,303,297 A | 4/1994 | Hillis | |

(Continued)

FOREIGN PATENT DOCUMENTS

| | | |
|---|---|---|
| DE | 3125161 | 1/1983 |
| DE | 4237987 | 5/1994 |

(Continued)

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. 18, Nov. 5, 2001, pp. 1-13.

(Continued)

*Primary Examiner* — Ricky Ngo
*Assistant Examiner* — Phuongchau B Nguyen
(74) *Attorney, Agent, or Firm* — Stolowitz Ford Cowger LLP

(57) ABSTRACT

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

15 Claims, 12 Drawing Sheets

U.S. PATENT DOCUMENTS

| | | | |
|---|---|---|---|
| 5,339,086 | A | 8/1994 | DeLuca |
| 5,341,301 | A | 8/1994 | Shirai |
| 5,438,361 | A | 8/1995 | Coleman |
| 5,471,214 | A | 11/1995 | Faibish |
| 5,485,892 | A | 1/1996 | Fujita |
| 5,506,963 | A | 4/1996 | Ducateau |
| 5,532,706 | A | 7/1996 | Reinhardt |
| 5,552,773 | A | 9/1996 | Kuhnert |
| 5,555,503 | A * | 9/1996 | Kyrtsos et al. ............... 701/207 |
| 5,572,201 | A | 11/1996 | Graham |
| 5,579,219 | A * | 11/1996 | Mori et al. ............... 700/4 |
| 5,581,462 | A | 12/1996 | Rogers |
| 5,585,798 | A | 12/1996 | Yoshioka |
| 5,617,085 | A | 4/1997 | Tsutsumi |
| 5,646,612 | A | 7/1997 | Byon |
| 5,661,811 | A | 8/1997 | Huemann et al. |
| 5,742,141 | A | 4/1998 | Czekaj |
| 5,749,060 | A | 5/1998 | Graf |
| 5,751,211 | A | 5/1998 | Shirai |
| 5,754,123 | A | 5/1998 | Nashif et al. |
| 5,761,320 | A | 6/1998 | Farinelli |
| 5,786,998 | A | 7/1998 | Neeson |
| 5,787,246 | A | 7/1998 | Lichtman |
| 5,794,164 | A | 8/1998 | Beckert |
| 5,872,508 | A | 2/1999 | Taoka |
| 5,898,392 | A | 4/1999 | Bambini |
| 5,907,293 | A | 5/1999 | Tognazzini |
| 5,915,214 | A | 6/1999 | Reece |
| 5,943,427 | A | 8/1999 | Massie et al. |
| 5,948,040 | A | 9/1999 | DeLorme |
| 5,951,620 | A | 9/1999 | Ahrens |
| 5,956,016 | A | 9/1999 | Kuenzner et al. |
| 5,956,250 | A * | 9/1999 | Gudat et al. ............... 701/26 |
| 5,957,985 | A | 9/1999 | Wong et al. |
| 5,959,536 | A | 9/1999 | Chambers |
| 5,963,092 | A | 10/1999 | Van Zalinge |
| 5,964,822 | A | 10/1999 | Alland |
| 5,966,658 | A | 10/1999 | Kennedy, III |
| 5,969,598 | A | 10/1999 | Kimura |
| 5,974,554 | A | 10/1999 | Oh |
| 5,977,906 | A | 11/1999 | Ameen |
| 5,983,092 | A | 11/1999 | Whinnett |
| 5,983,161 | A | 11/1999 | Lemelson |
| 6,009,330 | A | 12/1999 | Kennedy, III |
| 6,009,403 | A | 12/1999 | Sato |
| 6,028,537 | A | 2/2000 | Suman |
| 6,028,548 | A | 2/2000 | Farmer |
| 6,032,089 | A | 2/2000 | Buckley |
| 6,037,860 | A | 3/2000 | Zander et al. |
| 6,052,632 | A | 4/2000 | Iihoshi |
| 6,054,950 | A | 4/2000 | Fontana |
| 6,060,989 | A | 5/2000 | Gehlot |
| 6,061,002 | A | 5/2000 | Weber et al. |
| 6,061,709 | A | 5/2000 | Bronte |
| 6,075,467 | A | 6/2000 | Ninagawa |
| 6,097,285 | A | 8/2000 | Curtin |
| 6,097,314 | A | 8/2000 | Desens et al. |
| 6,128,608 | A | 10/2000 | Barnhill |
| 6,144,336 | A | 11/2000 | Preston et al. |
| 6,148,261 | A | 11/2000 | Obradovich |
| 6,150,961 | A | 11/2000 | Alewine |
| 6,154,123 | A | 11/2000 | Kleinberg |
| 6,161,071 | A | 12/2000 | Shuman |
| 6,163,711 | A | 12/2000 | Juntunen |
| 6,166,627 | A | 12/2000 | Reeley |
| 6,167,253 | A | 12/2000 | Farris |
| 6,169,894 | B1 | 1/2001 | McCormick |
| 6,175,728 | B1 | 1/2001 | Mitama |
| 6,175,782 | B1 | 1/2001 | Obradovich |
| 6,181,922 | B1 | 1/2001 | Iwai |
| 6,181,994 | B1 | 1/2001 | Colson |
| 6,182,006 | B1 | 1/2001 | Meek |
| 6,185,491 | B1 | 2/2001 | Gray |
| 6,195,760 | B1 | 2/2001 | Chung et al. |
| 6,202,027 | B1 | 3/2001 | Alland |
| 6,203,366 | B1 | 3/2001 | Muller |
| 6,204,804 | B1 | 3/2001 | Andersson |
| 6,226,389 | B1 | 5/2001 | Lemelson, III |
| 6,233,468 | B1 | 5/2001 | Chen |
| 6,236,652 | B1 | 5/2001 | Preston |
| 6,240,365 | B1 | 5/2001 | Bunn |
| 6,243,450 | B1 | 6/2001 | Jansen |
| 6,243,645 | B1 | 6/2001 | Moteki et al. |
| 6,247,079 | B1 | 6/2001 | Papa et al. |
| 6,252,544 | B1 | 6/2001 | Hoffberg |
| 6,275,231 | B1 | 8/2001 | Obradovich |
| D448,366 | S | 9/2001 | Youngers |
| 6,292,109 | B1 | 9/2001 | Murano |
| 6,292,747 | B1 | 9/2001 | Amro |
| 6,294,987 | B1 | 9/2001 | Matsuda |
| 6,297,732 | B2 | 10/2001 | Hsu |
| 6,298,302 | B2 | 10/2001 | Walgers |
| 6,314,326 | B1 | 11/2001 | Fuchu |
| 6,321,344 | B1 | 11/2001 | Fenchel |
| 6,326,903 | B1 | 12/2001 | Gross |
| 6,327,536 | B1 | 12/2001 | Tsuji |
| 6,362,748 | B1 | 3/2002 | Huang |
| 6,370,449 | B1 | 4/2002 | Razavi et al. |
| 6,374,286 | B1 | 4/2002 | Gee |
| 6,377,860 | B1 | 4/2002 | Gray |
| 6,382,897 | B2 | 5/2002 | Mattio |
| 6,389,340 | B1 | 5/2002 | Rayner |
| 6,401,029 | B1 | 6/2002 | Kubota |
| 6,405,132 | B1 | 6/2002 | Breed |
| 6,408,174 | B1 | 6/2002 | Steijer |
| 6,417,782 | B1 | 7/2002 | Darnall |
| 6,421,429 | B1 | 7/2002 | Merritt |
| 6,429,789 | B1 | 8/2002 | Kiridena |
| 6,429,812 | B1 | 8/2002 | Hoffberg |
| 6,430,164 | B1 * | 8/2002 | Jones et al. ............... 370/313 |
| 6,433,679 | B1 | 8/2002 | Schmid |
| 6,442,485 | B2 | 8/2002 | Evans |
| 6,445,308 | B1 | 9/2002 | Koike |
| 6,449,541 | B1 | 9/2002 | Goldberg et al. |
| 6,452,484 | B1 | 9/2002 | Drori |
| 6,463,373 | B2 | 10/2002 | Suganuma |
| 6,484,080 | B2 | 11/2002 | Breed |
| 6,493,338 | B1 | 12/2002 | Preston |
| 6,496,107 | B1 | 12/2002 | Himmelstein |
| 6,496,117 | B2 | 12/2002 | Gutta |
| 6,496,689 | B1 | 12/2002 | Keller |
| 6,505,100 | B1 | 1/2003 | Stuempfle |
| 6,515,595 | B1 | 2/2003 | Obradovich |
| 6,522,875 | B1 | 2/2003 | Dowling |
| 6,526,335 | B1 | 2/2003 | Treyz et al. |
| 6,542,812 | B1 | 4/2003 | Obradovich et al. |
| 6,559,773 | B1 | 5/2003 | Berry |
| 6,567,069 | B1 | 5/2003 | Bontrager et al. |
| 6,571,136 | B1 * | 5/2003 | Staiger ............... 370/403 |
| 6,574,734 | B1 | 6/2003 | Colson et al. |
| 6,584,403 | B2 | 6/2003 | Bunn |
| D479,228 | S | 9/2003 | Sakaguchi |
| 6,614,349 | B1 | 9/2003 | Proctor |
| 6,615,137 | B2 | 9/2003 | Preston |
| 6,616,071 | B2 | 9/2003 | Kitamura |
| 6,622,083 | B1 | 9/2003 | Knockeart |
| 6,629,033 | B2 | 9/2003 | Preston |
| 6,641,087 | B1 | 11/2003 | Nelson |
| 6,647,270 | B1 | 11/2003 | Himmelstein |
| 6,647,328 | B2 * | 11/2003 | Walker ............... 701/36 |
| 6,670,912 | B2 | 12/2003 | Honda |
| 6,675,081 | B2 | 1/2004 | Shuman |
| 6,678,892 | B1 | 1/2004 | Lavelle et al. |
| 6,681,121 | B1 | 1/2004 | Preston |
| 6,690,681 | B1 | 2/2004 | Preston |
| 6,707,421 | B1 | 3/2004 | Drury |
| 6,708,100 | B2 | 3/2004 | Russell |
| 6,714,139 | B2 | 3/2004 | Saito |
| 6,718,187 | B1 * | 4/2004 | Takagi et al. ............... 455/569.2 |
| 6,725,031 | B2 | 4/2004 | Watler |
| 6,734,799 | B2 | 5/2004 | Munch |
| 6,738,697 | B2 | 5/2004 | Breed |
| 6,748,278 | B1 | 6/2004 | Maymudes |
| 6,765,495 | B1 | 7/2004 | Dunning et al. |
| 6,771,208 | B2 | 8/2004 | Lutter |
| 6,771,629 | B1 | 8/2004 | Preston |
| 6,778,073 | B2 | 8/2004 | Lutter |

| | | |
|---|---|---|
| 6,778,924 B2 | 8/2004 | Hanse |
| 6,782,315 B2 | 8/2004 | Lu |
| 6,785,551 B1 | 8/2004 | Richard |
| 6,792,351 B2 | 9/2004 | Lutter |
| 6,799,092 B2 | 9/2004 | Lu et al. |
| 6,816,458 B1 | 11/2004 | Kroon |
| 6,876,642 B1 | 4/2005 | Adams |
| 6,892,230 B1 | 5/2005 | Gu et al. |
| 6,895,238 B2 | 5/2005 | Newell |
| 6,895,240 B2 | 5/2005 | Laursen |
| 6,901,057 B2 | 5/2005 | Rune |
| 6,906,619 B2 | 6/2005 | Williams |
| 6,920,129 B2 | 7/2005 | Preston |
| 6,925,368 B2 | 8/2005 | Funkhouser |
| 6,937,732 B2 | 8/2005 | Ohmura |
| 6,952,155 B2 | 10/2005 | Himmelstein |
| 6,972,669 B2 | 12/2005 | Saito |
| 6,973,030 B2 | 12/2005 | Pecen |
| 6,980,092 B2 | 12/2005 | Turnbull |
| 6,993,511 B2 | 1/2006 | Himmelstein |
| 7,000,469 B2 | 2/2006 | Foxlin |
| 7,006,950 B1 | 2/2006 | Greiffenhagen |
| 7,024,363 B1 | 4/2006 | Comerford |
| 7,079,993 B2 | 7/2006 | Stephenson |
| 7,085,710 B1 | 8/2006 | Beckert et al. |
| 7,089,206 B2 | 8/2006 | Martin |
| 7,092,723 B2 | 8/2006 | Himmelstein |
| 7,103,646 B1 | 9/2006 | Suzuki |
| 7,120,129 B2 | 10/2006 | Ayyagari |
| 7,123,926 B2 | 10/2006 | Himmelstein |
| 7,146,260 B2 | 12/2006 | Preston |
| 7,151,768 B2 | 12/2006 | Preston |
| 7,158,842 B2 | 1/2007 | Ohmura et al. |
| 7,158,956 B1 | 1/2007 | Himmelstein |
| 7,164,662 B2 | 1/2007 | Preston |
| 7,171,189 B2 | 1/2007 | Bianconi |
| 7,178,049 B2 | 2/2007 | Lutter |
| 7,187,947 B1 | 3/2007 | White |
| 7,206,305 B2 | 4/2007 | Preston |
| 7,207,042 B2 | 4/2007 | Smith |
| 7,215,965 B2 | 5/2007 | Fournier |
| 7,216,347 B1 | 5/2007 | Harrison et al. |
| 7,221,669 B2 | 5/2007 | Preston |
| 7,239,949 B2 | 7/2007 | Lu |
| 7,249,266 B2 | 7/2007 | Margalit |
| 7,257,426 B1 * | 8/2007 | Witkowski et al. .......... 455/569.2 |
| 7,263,332 B1 | 8/2007 | Nelson |
| 7,269,188 B2 | 9/2007 | Smith |
| 7,272,637 B1 | 9/2007 | Himmelstein |
| 7,274,988 B2 | 9/2007 | Mukaiyama |
| 7,277,693 B2 | 10/2007 | Chen |
| 7,283,567 B2 | 10/2007 | Preston |
| 7,283,904 B2 | 10/2007 | Benjamin |
| 7,286,522 B2 | 10/2007 | Preston |
| 7,317,696 B2 | 1/2008 | Preston |
| 7,337,650 B1 | 3/2008 | Preston |
| 7,343,160 B2 | 3/2008 | Morton |
| 7,375,728 B2 | 5/2008 | Donath |
| 7,379,707 B2 | 5/2008 | DiFonzo |
| 7,411,982 B2 | 8/2008 | Smith |
| 7,418,476 B2 | 8/2008 | Salesky |
| 7,450,955 B2 | 11/2008 | Himmelstein |
| 7,484,008 B1 | 1/2009 | Gelvin et al. |
| 7,493,645 B1 | 2/2009 | Tranchina |
| 7,506,020 B2 | 3/2009 | Ellis |
| 7,508,810 B2 | 3/2009 | Moinzadeh |
| 7,509,134 B2 | 3/2009 | Fournier |
| 7,587,370 B2 | 9/2009 | Himmelstein |
| 7,594,000 B2 | 9/2009 | Himmelstein |
| 7,596,391 B2 | 9/2009 | Himmelstein |
| 7,599,715 B2 | 10/2009 | Himmelstein |
| 7,610,331 B1 | 10/2009 | Genske |
| 7,614,055 B2 | 11/2009 | Buskens |
| 7,664,315 B2 | 2/2010 | Woodfill |
| 7,681,448 B1 | 3/2010 | Preston |
| 7,733,853 B2 | 6/2010 | Moinzadeh |
| 7,747,281 B2 | 6/2010 | Preston |
| 7,778,739 B2 | 8/2010 | Preston |
| 7,793,136 B2 | 9/2010 | Lutter |
| 7,848,763 B2 | 12/2010 | Fournier |
| 7,924,934 B2 | 4/2011 | Birmingham |
| 7,966,111 B2 | 6/2011 | Moinzadeh et al. |
| 7,979,095 B2 | 7/2011 | Birmingham |
| 7,983,310 B2 | 7/2011 | Hirano et al. |
| 8,001,860 B1 | 8/2011 | Preston |
| 8,006,117 B1 | 8/2011 | Lutter |
| 8,006,118 B1 | 8/2011 | Lutter |
| 8,006,119 B1 | 8/2011 | Lutter |
| 8,014,942 B2 | 9/2011 | Moinzadeh et al. |
| 8,020,028 B1 | 9/2011 | Lutter |
| 8,027,268 B2 | 9/2011 | Preston |
| 8,036,201 B2 | 10/2011 | Moinzadeh et al. |
| 8,036,600 B2 | 10/2011 | Garrett et al. |
| 8,045,729 B2 | 10/2011 | Preston |
| 8,068,792 B2 | 11/2011 | Preston |
| 8,108,092 B2 | 1/2012 | Philips et al. |
| 8,165,057 B2 | 4/2012 | Preston et al. |
| 2001/0009855 A1 | 7/2001 | L'Anson |
| 2002/0012329 A1 | 1/2002 | Atkinson |
| 2002/0022927 A1 | 2/2002 | Lemelson et al. |
| 2002/0070852 A1 | 6/2002 | Trauner |
| 2002/0085043 A1 | 7/2002 | Ribak |
| 2002/0095501 A1 | 7/2002 | Chiloyan et al. |
| 2002/0098878 A1 | 7/2002 | Mooney et al. |
| 2002/0105423 A1 | 8/2002 | Rast |
| 2002/0123325 A1 | 9/2002 | Cooper |
| 2002/0140548 A1 | 10/2002 | Lutter |
| 2002/0144010 A1 | 10/2002 | Younis |
| 2002/0144079 A1 | 10/2002 | Willis et al. |
| 2002/0155823 A1 | 10/2002 | Preston |
| 2003/0060188 A1 | 3/2003 | Gidron |
| 2003/0158614 A1 | 8/2003 | Friel |
| 2003/0212480 A1 | 11/2003 | Lutter |
| 2003/0212996 A1 | 11/2003 | Wolzien |
| 2004/0162064 A1 | 8/2004 | Himmelstein |
| 2004/0164228 A1 | 8/2004 | Fogg |
| 2005/0009506 A1 | 1/2005 | Smolentzov |
| 2005/0070221 A1 | 3/2005 | Upton |
| 2005/0130656 A1 | 6/2005 | Chen |
| 2005/0153654 A1 | 7/2005 | Anderson |
| 2005/0251328 A1 | 11/2005 | Merwe et al. |
| 2005/0260984 A1 | 11/2005 | Karabinis |
| 2005/0275505 A1 | 12/2005 | Himmelstein |
| 2005/0278712 A1 | 12/2005 | Buskens et al. |
| 2006/0293829 A1 | 12/2006 | Cornwell et al. |
| 2007/0115868 A1 | 5/2007 | Chen |
| 2007/0115897 A1 | 5/2007 | Chen |
| 2007/0260372 A1 | 11/2007 | Langer et al. |
| 2007/0260373 A1 | 11/2007 | Langer et al. |
| 2008/0092140 A1 | 4/2008 | Doninger et al. |
| 2009/0090592 A1 | 4/2009 | Mordukhovich et al. |
| 2010/0017543 A1 | 1/2010 | Preston |
| 2010/0241312 A1 | 9/2010 | Preston |
| 2010/0312433 A1 | 12/2010 | Preston |
| 2010/0330357 A1 | 12/2010 | Preston |

FOREIGN PATENT DOCUMENTS

| | | |
|---|---|---|
| DE | 19647283 A1 | 5/1997 |
| DE | 19922608 | 11/2000 |
| DE | 19931161 | 1/2001 |
| EP | 0355490 B1 | 2/1990 |
| EP | 0 441 576 | 8/1991 |
| EP | 0473866 A2 | 3/1992 |
| EP | 0 841 648 | 5/1998 |
| EP | 0841648 | 5/1998 |
| EP | 1 355 128 | 10/2003 |
| JP | 10-076115 | 10/1999 |
| JP | 2000207691 | 7/2000 |
| KR | 1999-021740 | 3/1999 |
| WO | WO9624229 | 8/1996 |
| WO | WO9908436 | 2/1999 |
| WO | WO9957662 | 11/1999 |
| WO | WO9965183 | 12/1999 |
| WO | WO 0029948 | 5/2000 |
| WO | WO0040038 | 7/2000 |
| WO | WO0130061 | 4/2001 |
| WO | WO0158110 | 8/2001 |
| WO | WO/03/033092 | 4/2003 |

OTHER PUBLICATIONS

Ada 95 Transition Support—Lessons Learned, Sections 3, 4, and 5, CACI, Inc.—Federal, Nov. 15, 1996, 14 pages.
AMIC. Architecture specification release 1, 2001; 35 pages.
Bluetooth Doc; Advance Audio Distribution Profile Specification; Adopted version 1.0; dated May 22, 2003; 75 pages.
Bluetooth Doc; Audio/Video Remote Control Profile; Version 1.0 Adopted; dated May 22, 2003; 52 pages.
Bluetooth Hands-free Profile 1.5 Nov. 25, 2005.
Bluetooth Specification version 1.1; Feb. 22, 2001; 452 pages.
Boeing News Release, "Boeing Demonstrates JSF Avionics Multi-Sensor Fusion", Seattle, WA, May 9, 2000, pp. 1-2.
Boeing Statement, "Chairman and CEO Phil Condit on the JSF Decision", Washington, D.C., Oct. 26, 2001, pp. 1-2.
Counterair: The Cutting Edge, Ch. 2 "The Evolutionary Trajectory the Fighter Pilot-Here to Stay?" AF2025 v3c8-2, Dec. 1996, pp. 1-7.
Counterair: The Cutting Edge, Ch. 4 "The Virtual Trajectory Air Superiority without an "Air" Force?" AF2025 v3c8-4, Dec. 1996, pp. 1-12.
Embedded Bluetooth Migrates to Lisbon and Seattle; 11 pages; Jan. 23, 2008.
Green Hills Software, Inc., "The AdaMULTI 2000 Integrated Development Environment," Copyright 2002, printed Jul. 9, 2002; 7 pages.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, 2001, pp. 1-6.
Hitachi Automated Highway System (AHS), Automotive Products, Hitachi, Ltd., Copyright 1994-2002, 8 pages.
IEEE Standard for Information Technology—POSIX Based Supercomputing Application Environment Profile; Jun. 14, 1995, 72 pages.
ISIS Project: Sensor Fusion, Linkoping University Division of Automatic Control and Communication Systems in cooperation with SAAB (Dynamics and Aircraft), 2001, 18 pages.
J. Takezaki, N. Ueki, T. Minowa, H. Kondoh, "Support System for Safe Driving—A Step Toward ITS Autonomous Driving—", Hitachi Review, vol. 49, Nov. 3, 2000, pp. 1-8.
Joint Strike Fighter Terrain Database, ets-news.com "Simulator Solutions" 2002, 3 pages.
Luttge, Karsten; "E-Charging API: Outsource Charging to a Payment Service Provider"; IEEE; 2001 (pp. 216-222).
M. Chantler, G. Russel, and R. Dunbar, "Probabilistic Sensor Fusion for Reliable Workspace Sensing", Fourth IARP workship on Underwater Robotics, Genoa, Nov. 1992, pp. 1-14.
MSRC Redacted Proposal, 3.0 Architecture Development, Aug. 29, 2002; pp. 1-43.
MyGig User Guide, Mar. 11, 2008.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Product description of Raytheon Electronic Systems (ES), Copyright 2002, pp. 1-2.
Product description of Raytheon RT Secure, "Development Environment", Copyright 2001, pp. 1-2.
Product description of Raytheon RT Secure, "Embedded Hard Real-Time Secure Operating System", Copyright 2000, pp. 1-2.
Product description of Raytheon RT Secure, Copyright 2001, pp. 1-2.
S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.
Specification of the Bluetooth System v1.0.B; Dec. 1, 1999.
Specification of the Bluetooth System v1.1; Feb. 22, 2001.
TNO FEL Annual Review 1998: Quality works, Observation Systems Division; "The Whole is More Than the Sum of its Parts"; 16 pages.
Vehicle Dynamics Lab, University of California, Berkeley, funded by BMW, current members: D. Caveney and B. Feldman, "Adaptive Cruise Control", at least as early as 2002, printed Jul. 2, 2002; 17 pages.
Stirling A: "Mobile Multimedia platforms" Vehicular Technology Conference Fall 2000. IEEE VTS Fall VTC2000. 52nd Vehicular Technology Conference (CAT. No. 00CH37152).
Nusser R. et al.: "Bluetooth-based wireless connectivity in an automotive environment" Vehicular Technology Conference Fall 2000. IEEE VTS Fall VTC2000 52nd Vehicular Technology Conference (Cat. No. 00CH37152).
Martins e f v et al. "design of an OS9 operating system extension for a message-passing multiprocessor" Microprocessors and Microsystems, IPC Business Press Lt. London, BG, vol. 21, No. 9, 1 Apr. 1998, pp. 533-543.
Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.
International Search Report for PCT/US02/020402; Mailing date Apr. 3, 2003.
International Search Report for PCT/US02/020403; Mailing date Jan. 27, 2003.
International Search Report for PCT/US02/016364; Mailing date Feb. 14, 2003.
International Search Report for PCT/US02/016371; Mailing date Aug. 18, 2003.
Stolowitz Ford Cowger LLP Listing of Related Cases Oct. 18, 2011.
U.S. Appl. No. 11/326,708, filed Jan. 5, 2006, Wireless Communication System Using Dynamic Mobile Cells, Preston.
U.S. Appl. No. 10/224,306, filed Aug. 19, 2002, Wireless Communication System Using Dynamic Mobile Cells, Preston.
U.S. Appl. No. 11/327,246, filed Jan. 5, 2006, Method of Incorporating a Vehicle Operator into a Vehicular Multisensor Environment, Preston.
U.S. Appl. No. 10/224,307, filed Aug. 19, 2002, Method of Incorporating the Driver into a Vehicular Multisensor Environment, Lutter.
U.S. Appl. No. 10/426,244, filed Apr. 29, 2003, Method and Apparatus for Transferring Information Between Vehicles, Lutter.
U.S. Appl. No. 12/979,186, filed Dec. 27, 2010, Method and Apparatus for Dynamic Configuration of Multiprocessor System, Preston.
U.S. Appl. No. 12/979,198, filed Dec. 27, 2010, Method and Apparatus for Dynamic Configuration of Multiprocessor System, Preston.
Robert Bosch GmbH, "CAN Specification, Version 2.0," Sep. 1991.
Wang, Z. et al. "A Message Priority Assignment Algorithm for CAN-based Networks," in CSC '92 Proceedings of the 1992 ACM Annual Conference on Communications, Mar. 1992.
Fay-Wolfe, et al., "Real-Time CORBA," IEEE Transactions on Parallel and Distributed Systems, vol. 11, Issue 10 (Oct. 2000).
Rene Nusser and Rodolfo Mann Pelz, "Bluetooth-based Wireless Connectivity in an Automotive Environment," IEEE pp. 1935-1942, Vehicular Technology Conference, 2000.
Husein et al., "A Priority Based Service Algorithm for Use in Time-Critical and Integrated Services Networks," Proceedings of IEEE Singapore International Conference, vol. 1, pp. 93-97, 1993.
Release 1 Specification Set from the Automotive Multimedia Interface Collaboration (AMI-C), Jan. 2001.
Open Services Gateway Initiative (OSGi) Service Gateway Specification Release 1.0, May 2000.
Ellis, S. M., "Dynamic Software Reconfiguration for Fault-Tolerant Real-Time Avionic Systems," Microprocessor and Microsystems, Proceedings of the 1996 Avionics Conference and Exhibition, vol. 21, issue 1, pp. 29-39, Jul. 1997.
Peter Walzer, and Hans-Wilhelm Grove, "Integrated Research Volkswagen (IRVW) Futura," Passenger Car Meeting and Exposition, Dearborn, Michigan, Sep. 17-20, 1990.
Specification vol. 1, Specification of the Bluetooth System, Version 1.1, Feb. 22, 2001.
Bluetooth ESDP for UPnP, prepared by Arun Ayyagan, Jan. 31, 2001.
Nace, W. & Koopman, P., "A Product Family Based Approach to Graceful Degradation," Proceedings of DIPES 2000, International IFIP WG 10.3/WG 10.4/WG 10.5 Workshop on, Distributed and Parallel Embedded Systems, Paderborn University, Germany, Oct. 18-19, 2000.

Meredith Beveridge, "M.S. Project Report, Jini on the Control Area Network (CAN): A Case Study in Portability Failure", Department of Electrical and Computer Engineering, Carnegie Mellon University, Phil Koopman—advisor, Mar. 2001.

Universal Serial Bus Specification, Revision 1.1, Compaq, Intel, Microsoft and NEC, Sep. 23, 1998.

Universal Serial Bus Specification, Revision 2.0, Compaq, Hewlett-Packard, Intel, Lucent, Microsoft, NEC and Philips, Apr. 27, 2000.

Tindell, Ken, et al, "A CAN Communications Concept with Guaranteed Message Latencies", Oct. 1998.

Robinson, Ralph L., "An Open Versus Closed Architecture for Multimedia Systems," Proceedings of the 2000 International Congress on Transportation Electronics, pp. 445-450, Oct. 2000.

Y. Chubachi and H. Okagaki, "The Development of Traffic Information System Using AutoPC," Proceedings of the 2000 International Congress on Transportation Electronics, pp. 81-88, Oct. 2000.

M. Tchorowski and J. Mate, "Avionics and Automotive bandwagon flying together on the infotronics Highway," Proceedings of the 1998 International Congress on Transportation Electronics, pp. 351-354, Oct. 1998.

Fout, Tom, "Universal Plug and Play in Windows XP," Jul. 1, 2001.

Yen, H.W., et al., "Information Security and Integrity in Network Vehicle," Proceedings of the 1998 International Congress on Transportation Electronics, pp. 319-323, Oct. 1998.

Minagawa, Shoichi, et al, "Open Architectural Car Multimedia Platform," Proceedings of the 1998 International Congress on Transportation Electronics, pp. 198-194 Oct. 1998.

Kanemitsu, Dean et al. "Productivitys Next Dimension—The Mobile Office Computing Platform," Proceedings of the 2000 International Congress on Transportation Electronics, pp. 159-165, Oct. 2000.

Bhaskaran, Parvathy, "Reinventing the Car Radio for the Internet—the iRadio™," Proceedings of the 2000, International Congress on Transportation Electronics, pp. 147-153, Oct. 2000.

Buckley, Stephen, et al., "The Car as a Peripheral—Adapting a Portable Computer to a Vehicle Intranet," Proceedings of the 1998 International Congress on Transportation Electronics, pp. 211-217, Oct. 1998.

Arnold, Ken, et al., "The Jini Specification," Publisher Addison-Wesley, 1999.

Powers, Chuck, et al., Today's Electronics in Todays Vehicles, Proceedings of the 1998 International Congress on Transportation Electronics, pp. 195-200, Oct. 1998.

Vaught, Mark A., "Phone-Activated Auto-Muting Circuit," Jan. 1990.

Clarion Co. Ltd., "Clarion AutoPC 310C Owner's Manual," 1998.

Clarion, "2002 Clarion Product Catalog Car Audio, Multimedia, Marine, and Security Retail Products," 2002.

Clarion Co., Ltd., "Joyride Quick Reference Guide," 2000-2001.

Joyride, Windows CE System Software User's Manual, 1999-2001.

Lind, R., et al., "The Network Vehicle—A Glimpse into the Future of Mobile Multi-Media," IEEE AES Systems Magazine, Sep. 1999.

First Amended Complaint and Answer from *Eagle Harbor Holdings, LLC*, and *Mediustech, LLC*, v. *Ford Motor Company*, Washington Western District Court, Case No. 3:11-CV-05503-BHS, Case filed: Jun. 30, 2011.

Exhibits and Modules from *Eagle Harbor Holdings, LLC*, and *Mediustech, LLC*, v. *Ford Motor Company*, Washington Western District Court, Case No. 3:11-CV-05503-BHS, Case filed: Jun. 30, 2011.

Stolowitz Ford Cowger LLP, Listing of Related Cases, Jun. 14, 2012.

U.S. Appl. No. 13/188,856, filed Jul. 22, 2011, Failure Determination System, Lutter.

U.S. Appl. No. 13/196,654, filed Aug. 2, 2011, Method and Apparatus to Dynamically Configure a Vehicle Audio System, Preston.

U.S. Appl. No. 13/430,368, filed Mar. 26, 2012, Dynamic Configuration of a Home Multiprocessor System, Preston.

\* cited by examiner

METHOD AND APPARATUS FOR DYNAMIC CONFIGURATION OF MULTIPROCESSORS SYSTEM

This application is a continuation of U.S. patent application Ser. No. 12/258,234 filed Oct. 24, 2008, which is a continuation of U.S. patent application Ser. No. 11/462,958 filed Aug. 7, 2006, now issued U.S. Pat. No. 7,778,739 issued on Aug. 7, 2010, that is a continuation of U.S. patent application Ser. No. 09/841,915, filed Apr. 24, 2001, now U.S. Pat. No. 7,146,260 issued on Dec. 5, 2006, the disclosures of which are incorporated herein by reference in their entirety.

BACKGROUND

Cars include many different electro-mechanical and electronic applications. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems operate independently and do not talk to the other car systems. For example, separate processors and separate user interfaces are required for the car temperature control system and for the car audio system. Many of these different car processors may be underutilized since they are only used intermittently.

Even when multiple processors in the car do talk to each other, they are usually so tightly coupled together that it is impossible to change any one of these processors without disrupting all of the systems that are linked together. For example, some cars may have a dashboard interface that controls both internal car temperature and a car radio. The car radio cannot be replaced with a different model and still work with the dashboard interface and the car temperature controller.

Integration of new systems into a car is also limited. Car systems are designed and selected well before the car is ever built. A custom wiring harness is then designed to connect only those car systems selected for the car. A car owner cannot incorporate new systems into the existing car. For example, a car may not originally come with a navigation system. An after market navigation system from another manufacturer cannot be integrated into the existing car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer not from the front dashboard of the car, but from the passenger seat or the car. This makes many after market devices both difficult and dangerous to operate while driving.

The present invention addresses this and other problems associated with the prior art.

SUMMARY OF THE INVENTION

A multiprocessor system used in a car, home, or office environment includes multiple processors that nm different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

DETAILED DESCRIPTION

Figure 1:
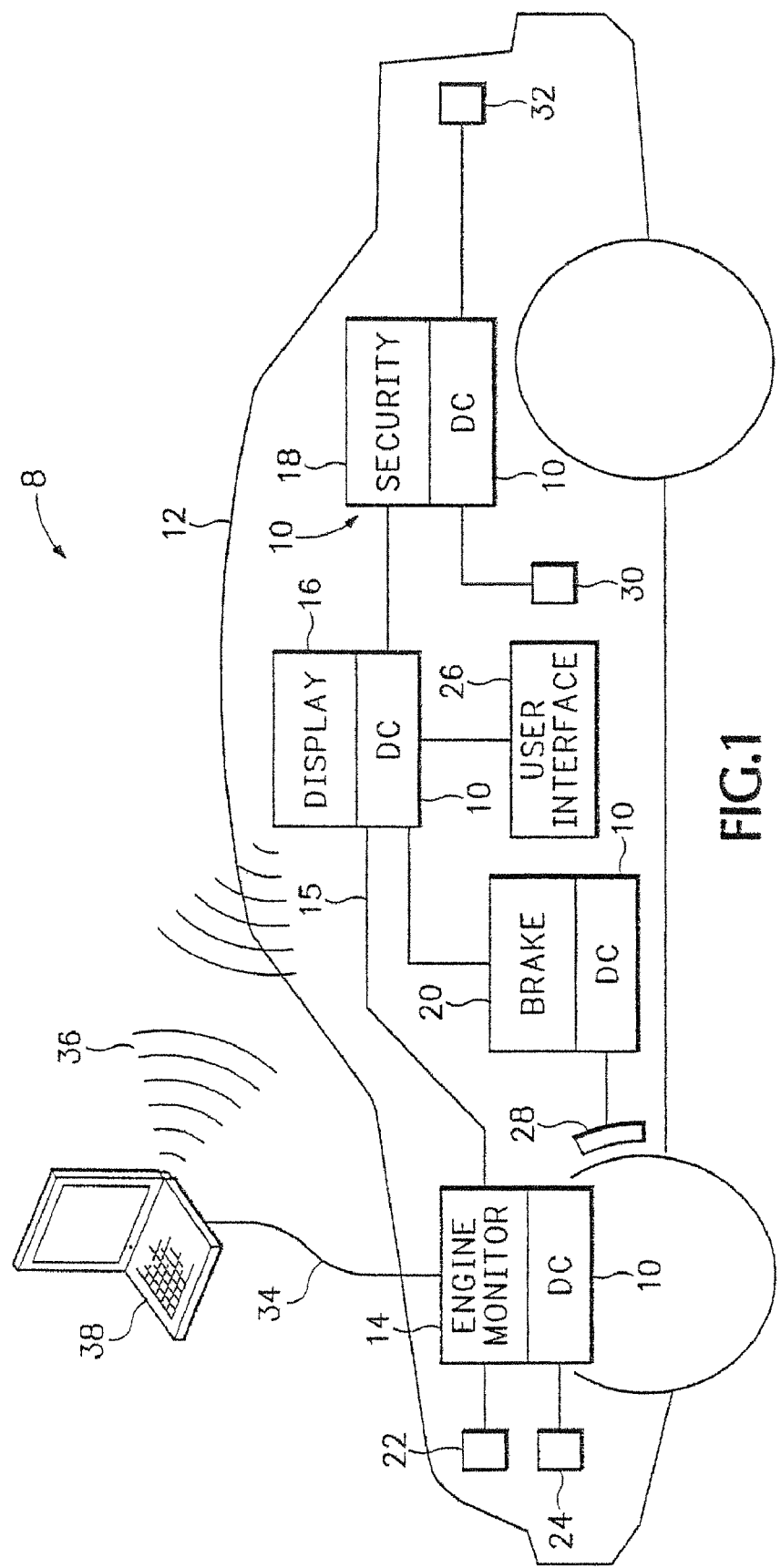
FIG. 1 is a diagram of a car that has multiple processors that each run a Dynamic Configuration (DC) system.

FIG. 1 shows a car 12 that includes a car multiprocessor system 8 having multiple processors 14, 16, 18 and 20. An engine monitor processor 14 monitors data from different sensors 22 and 24 in the car engine. The sensors 22 and 24 can be any sensing device such as sensors that monitor water temperature, oil temperature, fuel consumption, car speed, etc. A brake control processor 20 monitors and controls an Automatic Braking System (ABS) 28. A display processor 16 is used to control and monitor a graphical user interface 26. A security processor 18 monitors and controls latches and sensors 30 and 32 that are used in a car security system.

The processors 14, 16, 18 and 20 all include software that run a Dynamic Configuration (DC) system 10 that enables new processors or devices to be automatically added and removed from the car multiprocessor system 8. The DC system 10 also automatically reconfigures the applications running on different processors according to application failures and other system processing requirements.

For example, the processor 20 may currently be running a high priority brake control application. If the processor 20 fails, the DC system 10 can automatically download the braking application to another processor in car 12. The DC system 10 automatically identifies another processor with capacity to run the braking control application currently running in processor 20. The DC system 10 then automatically downloads a copy of the braking control application to the identified processor. If there is no extra reserve processing resources available, the DC system 10 may replace a non-critical application running on another processor. For example, the DC system 10 may cause the display processor 16 to terminate a current non-critical application and then download the brake control application along with any stored critical data.

The DC system 10 also automatically incorporates new processors or applications into the multiprocessor system 8. For example, a laptop computer 38 can communicate with the engine monitor processor 34 through a hardwired link 34 or communicate to the display processor 16 through a wireless link 36. The DC system 10 automatically integrates the laptop computer 38, or any other processor or device, into the multiprocessor system 8. After integrated into the multiprocessor system 8, not only can the laptop computer 38 transfer data with other processors, but the laptop computer may also run car applications normally run by other processors in car 12.

The DC system 10 allows the car driver to manage how different applications are processed in the car 12. As described above, a car operator may have to run an aftermarket navigation system through a GPS transceiver attached to the laptop computer 38. The car driver has to place the laptop computer 38 in the passengers seat and then operate the laptop computer 38 while driving.

The DC system 10 in the display computer 16 can automatically detect the navigation application running on the laptop computer 38. The display computer 16 notifies the car operator through the user interface 26 that the navigation application has been detected. The car operator can then control the navigation application through the user interface 26. Since the user interface 26 is located in the dashboard of car 12, the car operator no longer has to take his eyes off the road while operating the navigation application.

The description below gives only a few examples of the different processors, devices and applications that can be implemented using the DC system 10. Any single or multi-processor system located either inside or outside of car 12 can communicate and exchange data using the OC system 10. It should also be understood that the DC system 10 can be used in any real-time environment such as between processors in different home or office appliances and different home and office computers.

Figure 2:
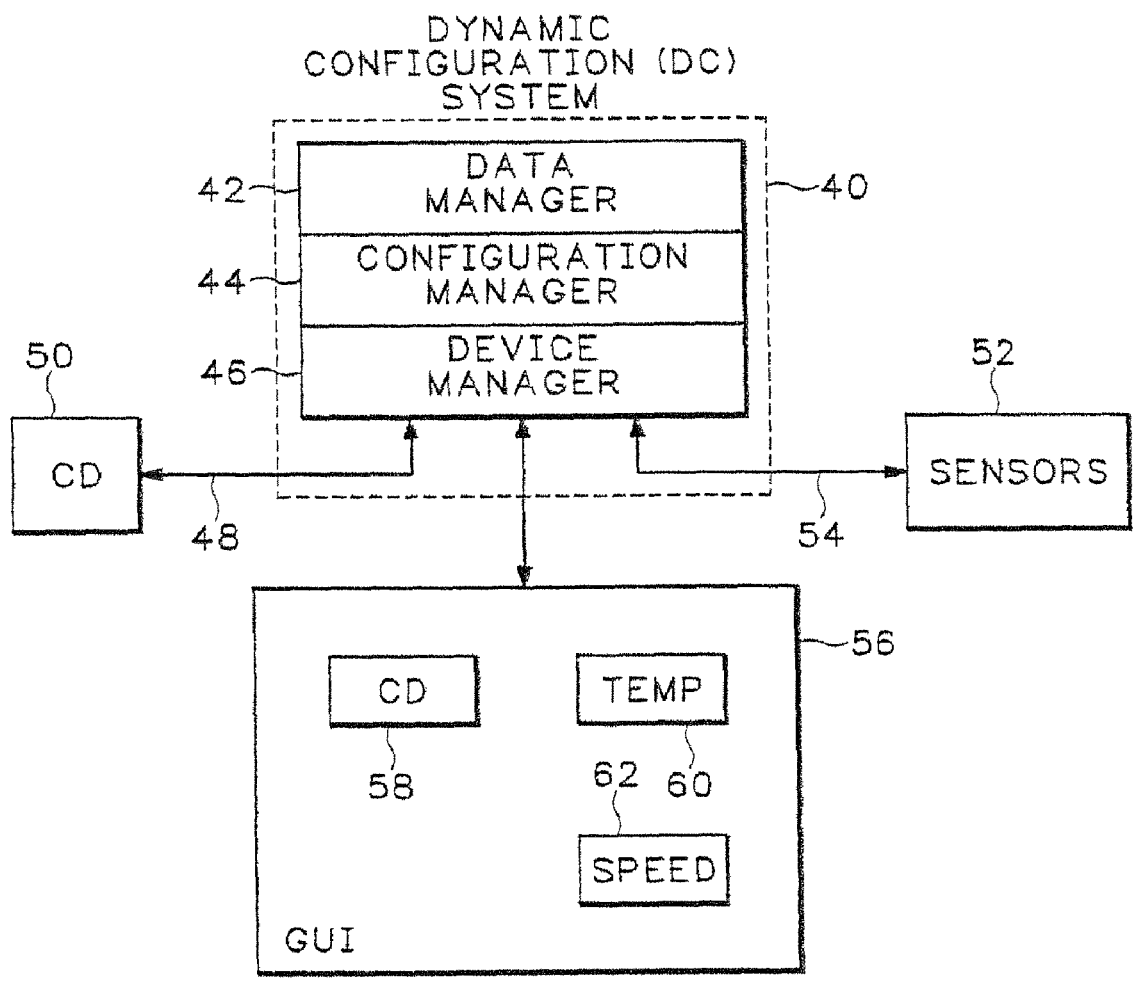
FIG. 2 is a detailed diagram of the dynamic configuration system shown in FIG. 1.

FIG. 2 is a block diagram showing in more detail the Dynamic Control (DC) system 10 located in a processor 40 that makes up part of the multiprocessor system 8 in car 12 (FIG. 1). The DC system 10 includes a device manager 46 that establishes communications with new devices that are to be incorporated into the multiprocessor system 8. A configuration manager 44 in the processor 40 dynamically moves applications between different processors according to user inputs and other monitored conditions in the multiprocessor system 8. A data manager 42 identifies a type of data input or output by a new processor and identifies other processors or devices in the multiprocessor system that can output data from the new device or input data to the new device.

In one example, sensors 52 feed sensor data to processor 40. The sensor data may include engine-monitoring data such as speed, oil temperature, water temperature, temperature inside the car cab, door open/shut conditions, etc. The sensors 52 are coupled to processor 40 through a link 54, such as a proprietary bus. A Compact Disc (CD) player 50 is coupled to the processor 40 through another link 48, such as a Universal Serial Bus (USB). Graphical User Interface (GUI) 56 displays the data associated with sensors 52 and CD player 50. The GUI 56 displays the outputs from sensors 52 using an icon 60 to identify temperature data and an icon 62 to identify car speed. The processor displays the CD player 50 as icon 62.

Figure 3:
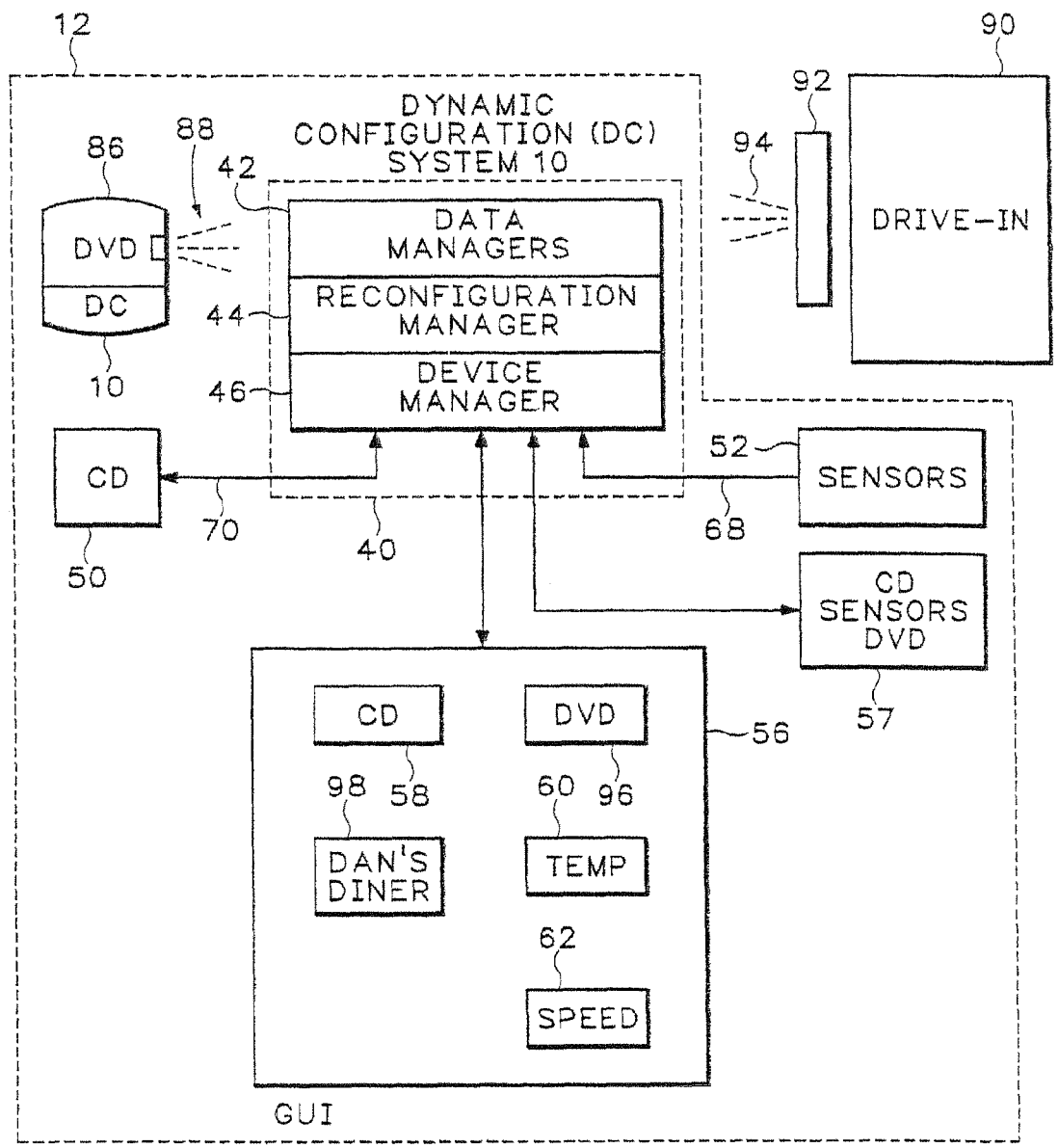
FIGS. 3 and 4 are diagrams showing an example of how the DC system operates.
Figure 4:
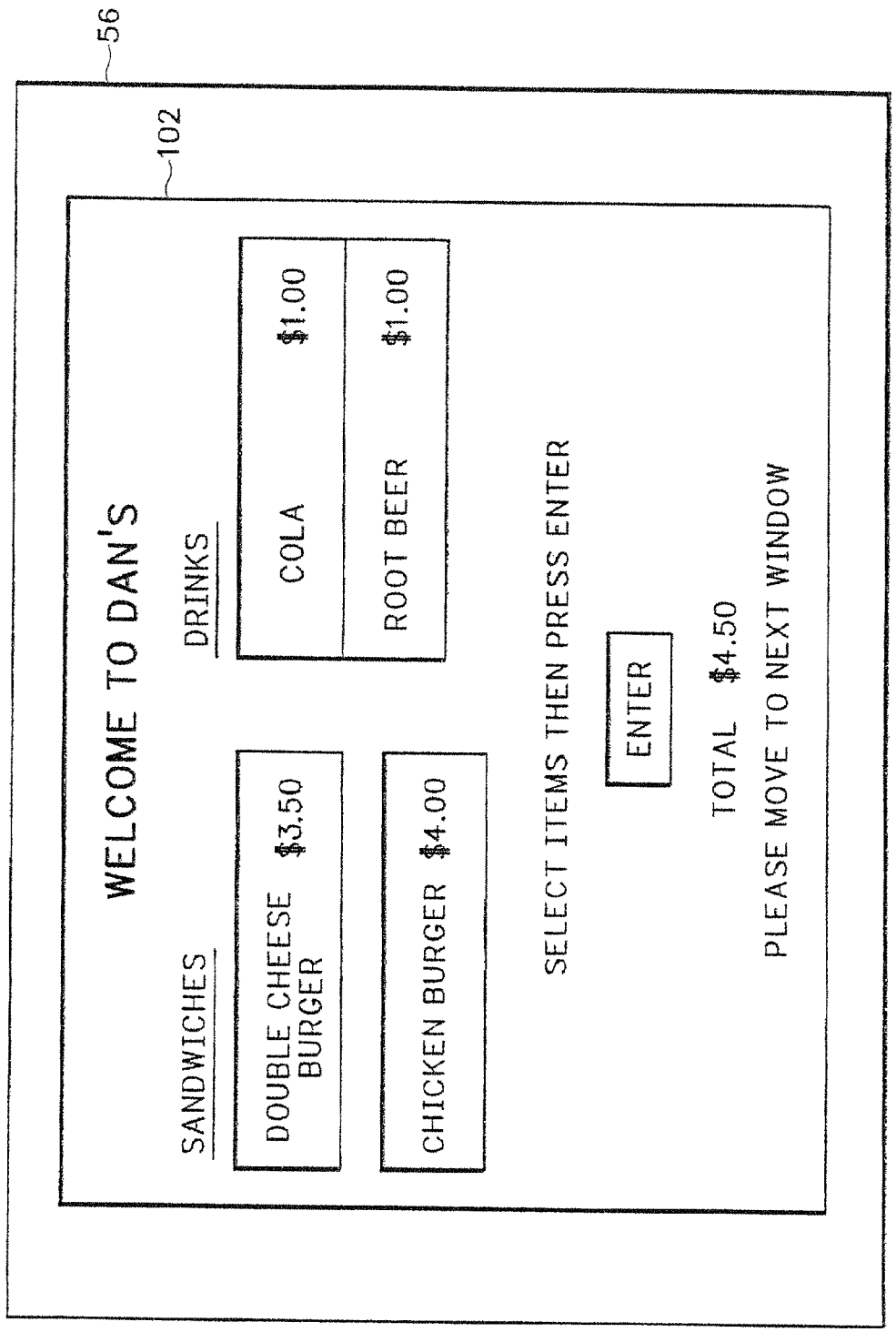

FIGS. 3 and 4 show an example of how two new applications are dynamically added to the multiprocessor system 8 in car 12 (FIG. 1). In FIG. 2, the DC system 10 in processor 40 previously detected a CD player 50 and some sensors 56. The CD player 50 was displayed on GUI 56 as icon 58 and the temperature and speed data from sensors 56 were displayed on GUI 56 as icons 60 and 62, respectfully.

The processor 40 is located in car 12 (FIG. 1). A passenger may bring a Digital Video Disc (DVD) player 86 into the car 12. The DVD 86 sends out a wireless or wired signal 88 to the processor 40. For example, the DVD 86 may send out signals using a IEEE 802.11 wireless protocol. The processor 40 includes an IEEE 802.11 interface that reads the signals 88 from DVD player 86. If the 802.11 protocol is identified as one of the protocols used by processor 40, the DC system 10 incorporates the DVD player 86 into a processor array 57 that lists different recognized applications.

The DC system 10 then automatically displays the newly detected DVD player 86 on GUI 56 as icon 96. If capable, the car operator by selecting the icon 96 can then display a video stream output from the DVD player 86 over GUI 56. The DVD player 86 can now be controlled from the GUI 56 on the car dashboard. This prevents the car driver from having to divert his eyes from the road while trying to operate the portable DVD player 86 from another location in the car, such as from the passenger seat.

Other processors or devices can also be incorporated into the multiprocessor system 8 in car 12. In another example, the car 12 drives up to a drive-in restaurant 90. The drive-in 90 includes a transmitter 92 that sends out a wireless Blue tooth signal 94. The processor 40 includes a Blue tooth transceiver that allows communication with transmitter 92. The DC system 10 recognizes the signals 94 from transmitter 92 and then incorporates the drive-in 90 into the multiprocessor system 8 (FIG. 1). The DC system 10 then displays the drive-in 90 as icon 98 in GUI 56.

Referring to FIG. 4, when the car operator selects the icon 98, a menu 102 for the driver-in 90 is displayed on the GUI 56. The car operator can then select any of the items displayed on the electronic menu 102. The selections made by the car operator are sent back to the transceiver 92 (FIG. 3). The amount of the order is calculated and sent back to the processor 40 and displayed on menu 102. Other messages, such as a direction for the car operator to move to the next window and pickup the order can also be displayed on the GUI 56. At the same time, the drive-in transceiver 92 (FIG. 3) may send audio signals that are received by the processor 40 and played out over speakers in ear 12.

Figure 5:
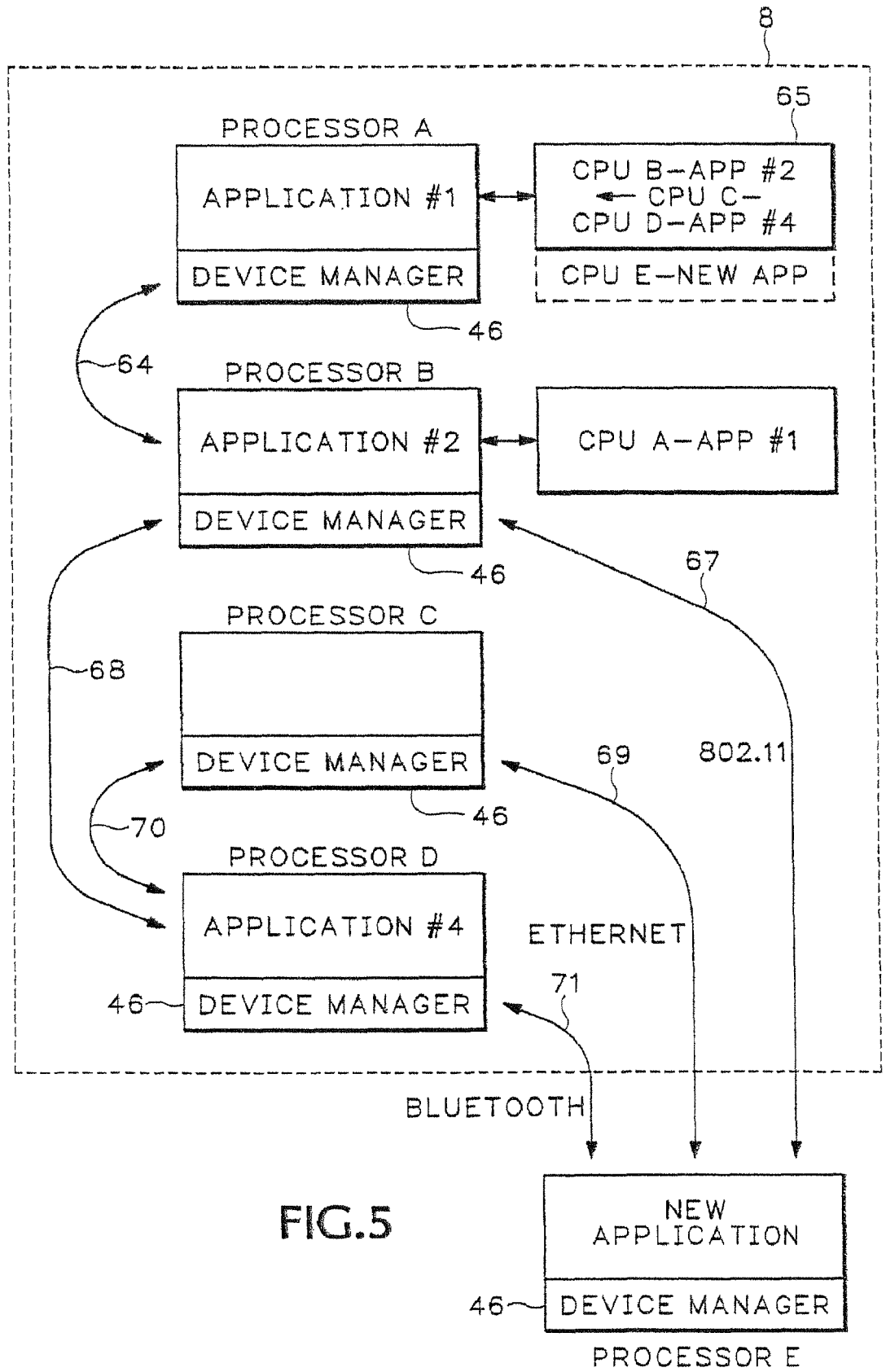
FIGS. 5 and 6 are diagrams showing how a device manager in the DC system operates.

FIG. 5 shows in more detail the operation of the device manager 46 previously shown in FIG. 2. Multiple processors A, B, C and D all include device managers 46. The device managers 46 can each identify other devices in the multiprocessor system that it communicates with. For example, processors A, B, C and D communicate to each other over one or more communication links including a Ethernet link 64, a wireless 802.11 link 68, or a blue tooth link 70.

Processor A includes a memory 65 that stores the other recognized processors B, C and D. The data managers 46 also identify any applications that may be running on the identified processors. For example, memory 65 for processor A identifies an application #2 running on processor B, no applications running on processor C, and an application #4 running on processor D.

Figure 6:
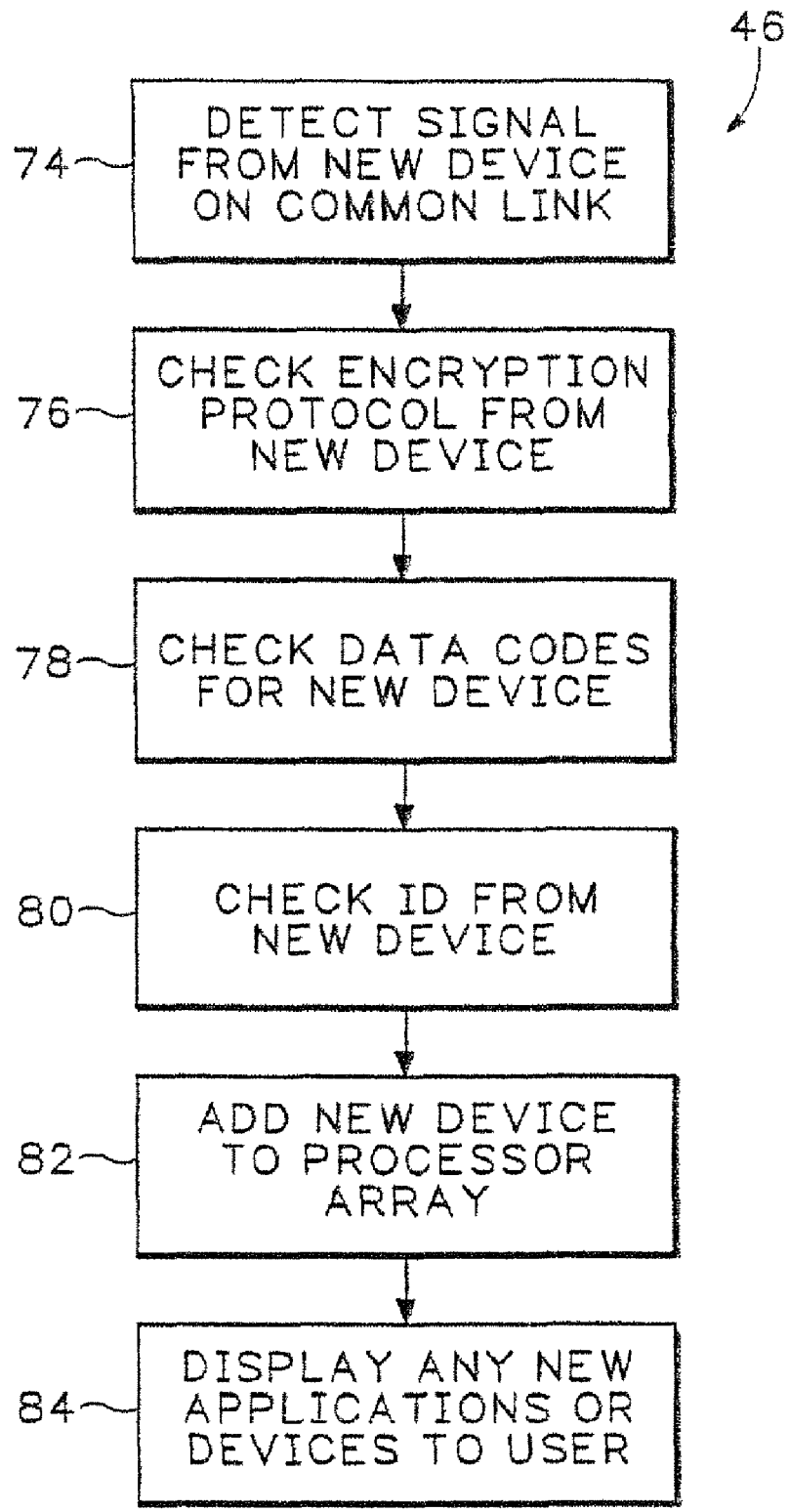

FIGS. 5 and 6 show how a new device is added to the multiprocessor system 8. Each of the existing processors A, B, C, and D after power-up are configured to identify a set or subset of the processors in the multiprocessor system 8. A new device 72 is brought into the multiprocessor system 8 either via a hardwired link or a wireless link. For example, the device E may send out signals over any one or more of a 802.11 wireless link 67, Blue tooth wireless link 71 or send out signals over a hardwired Ethernet link 69. Depending on what communication protocol is used to send signals, one or more of the processors A, B, C or D using a similar communication protocol detect the processor E in block 74 (FIG. 6). All of the processors may be connected to the same fiber optic or packet switched network that is then used to communicate the information from processor E to the other processors.

One of the device managers 46 in the multiprocessor system 8 cheeks the signals from processor E checks to determine if the signals are encrypted in a recognizable protocol in block 76. The device manager in the processor receiving the signals from processor E then checks for any data codes from the new device signals in block 76. The data codes identify data types used in one or more applications by processor E. A device ID for processor E is then determined from the output signals in block 80.

If all these data parameters are verified, the device managers 46 in one or more of the processors A, B, C and D add the new processor E to their processor arrays in block 82. For example, processor A adds processor E to the processor array in memory 65. After being incorporated into the multiprocessor system 8, the processor E or the applications running on the processor E may be displayed on a graphical user interface in block 84.

Figure 7:
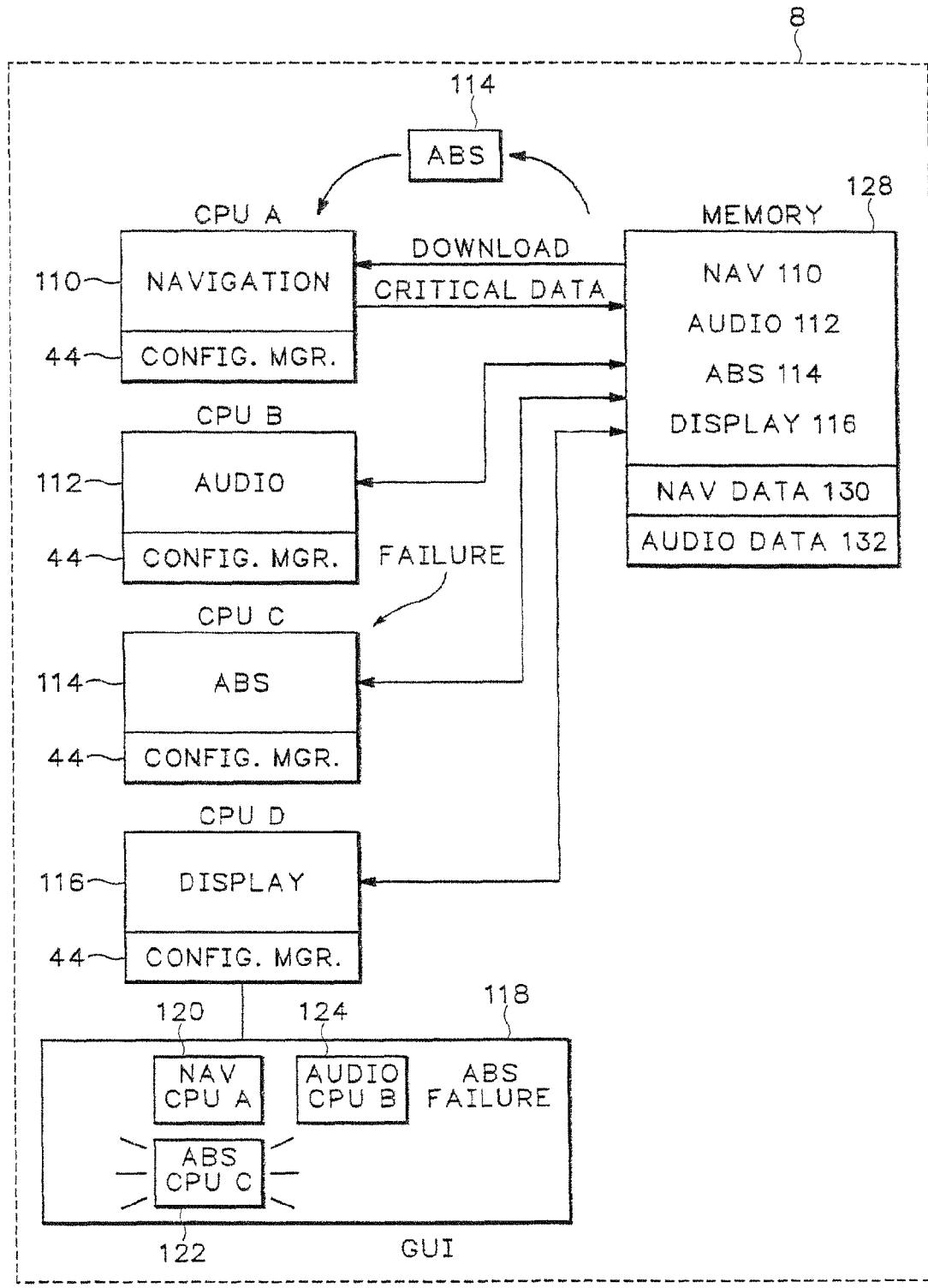
FIGS. 7-10 are diagrams showing how a reconfiguration manager in the DC system operates.

FIG. 7 describes in further detail the operation of the reconfiguration manager 44 previously described in FIG. 2. In the car multiprocessor system 8 there are four processors A, B, C and D. Of course there may be more than four processors running at the same time in the car but only four are shown in FIG. 7 for illustrative purposes. The processor A currently is operating a navigation application 110 that uses a Global Positioning System (UPS) to identify car location. Processor B currently runs an audio application 112 that controls a car radio and CD player. The processor C runs a car Automatic Braking System (ABS) application 114 and the processor D runs a display application 116 that outputs information to the car operator through a GUI 118.

The processor D displays an icon 120 on GUI 118 that represents the navigation system 110 running in processor A. An icon 124 represents the audio application running in processor B and an icon 122 represents the ABS application 114 running in processor C.

The memory 128 stores copies of the navigation application 110, audio application 112, ABS application 114 and display application 116. The memory 128 can also store data associated with the different applications. For example, navigation data 130 and audio data 132 are also stored in memory 128. The navigation data 130 may consist of the last several minutes of tracking data obtained by the navigation application 110. The audio data 132 may include the latest audio tracks played by the audio application 112.

The memory 128 can be any CD, hard disk, Read Only Memory (ROM), Dynamic Random Access (RAM) memory, etc. or any combination of different memory devices. The memory 128 can include a central memory that all or some of the processors can access and may also include different local memories that are accessed locally by specific processors.

Figure 8:
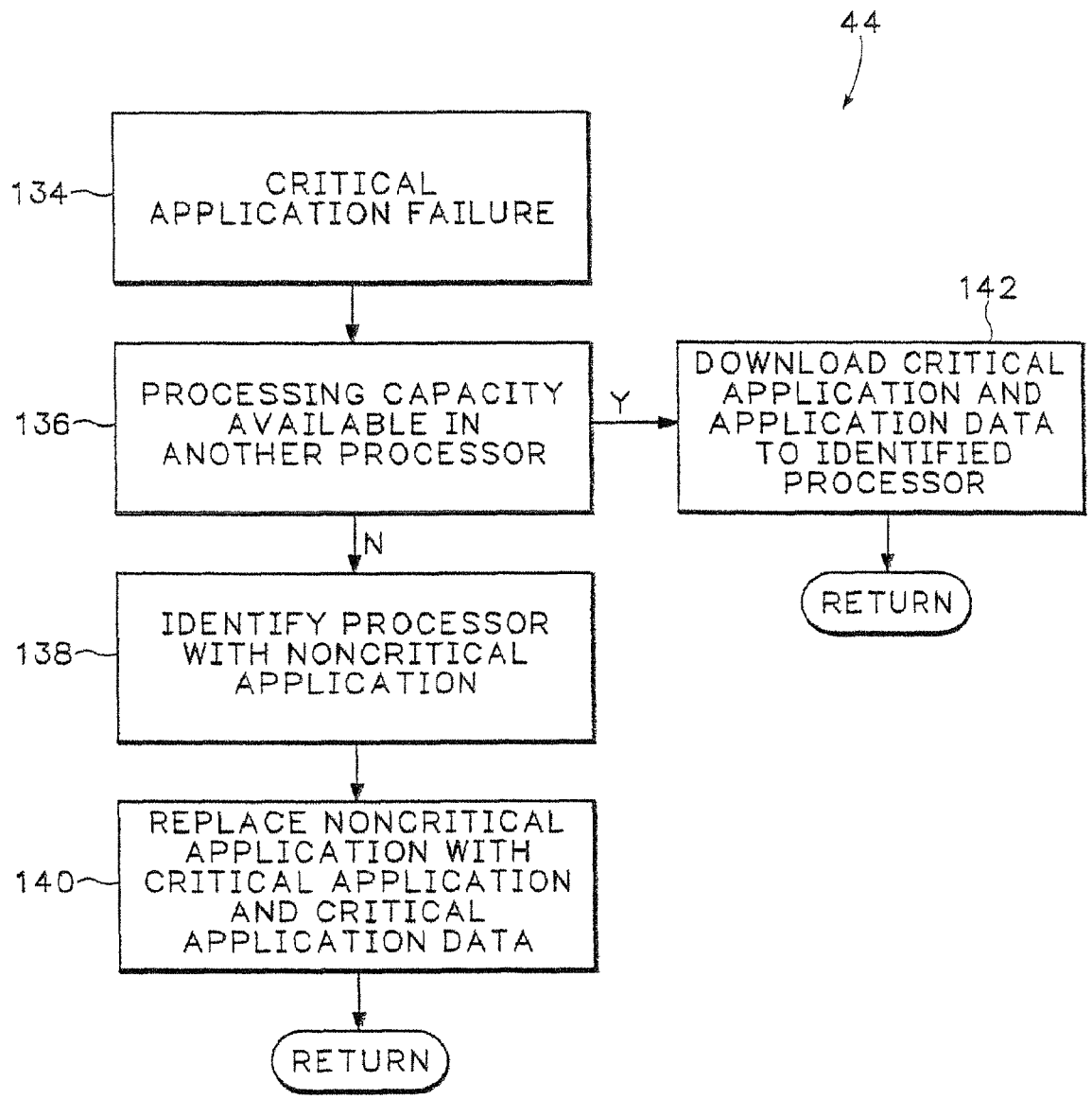

FIG. 8 shows one example of how the configuration manager 44 reconfigures the multiprocessor system when a failure occurs in a critical application, such as a failure of the ABS application 114. The configuration manager 44 for one of the processors in the multiprocessor system 8 detects a critical application failure in block 134.

One or more of the configuration managers 44 include a watchdog function that both monitors its own applications and the applications running on other processors. If an internal application fails, the configuration manager may store critical data for the failed application. The data for each application if stored in the memory 128 can selectively be encrypted so that only the car operator has the authority to download certain types of data.

The configuration manager detecting the failure initiates a reboot operation for that particular application. The application is downloaded again from memory 128 and, if applicable, any stored application data. If the application continues to lockup, the configuration manager may then initiate a reconfiguration sequence that moves the application to another processor.

Failures are identified by the watchdog functions in one example by periodically sending out heartbeat signals to the other processors. If the heartbeat from one of the processors is not detected for one of the processors, the configuration manager 44 for the processor that monitors that heartbeat attempts to communicate with the processor or application. If the application or processor with no heartbeat does not respond, the reconfiguration process is initiated.

In another example, certain processors may monitor different applications. For example, a sensor processor may constantly monitor the car speed when the car operator presses the brake pedal. If the car speed does not slow down when the brake is applied, the sensor processor may check for a failure in either the braking application or the speed sensing application. If a failure is detected, the configuration manager initiates the reconfiguration routine.

When reconfiguration is required, one of the reconfiguration managers 44 first tries to identify a processor that has extra processing capacity to run the failed application in block 136. For example, there may be a backup processor in the multiprocessor system where the ABS application 114 can be downloaded. If extra processing resources are available, the ABS application 114 is downloaded from the memory 128 (FIG. 7) to the backup processor in block 142.

There may also be data associated with the failed application that is stored in memory 128. For example, the brake commands for the ABS application 114 may have been previously identified for logging in memory 128 using a logging label described in co-pending application entitled: OPEN COMMUNICATION SYSTEM FOR REAL-TIME MULTI-PROCESSOR APPLICATIONS, Ser. No. 09/841,753 filed Apr. 24, 2001 which is herein incorporated by reference. The logged brake commands are downloaded to the backup processor in block 142.

If no backup processing resources can be identified in block 136, the configuration manager 44 identifies one of the processors in the multiprocessor system that is running a non-critical application. For example, the configuration manager 44 may identify the navigation application 110 in processor A as a non-critical application. The configuration manager 44 in block 140 automatically replaces the non-critical navigation application 110 in processor A with the critical ABS application 114 in memory 128. The processor A then starts running the ABS application 114.

Figure 9:
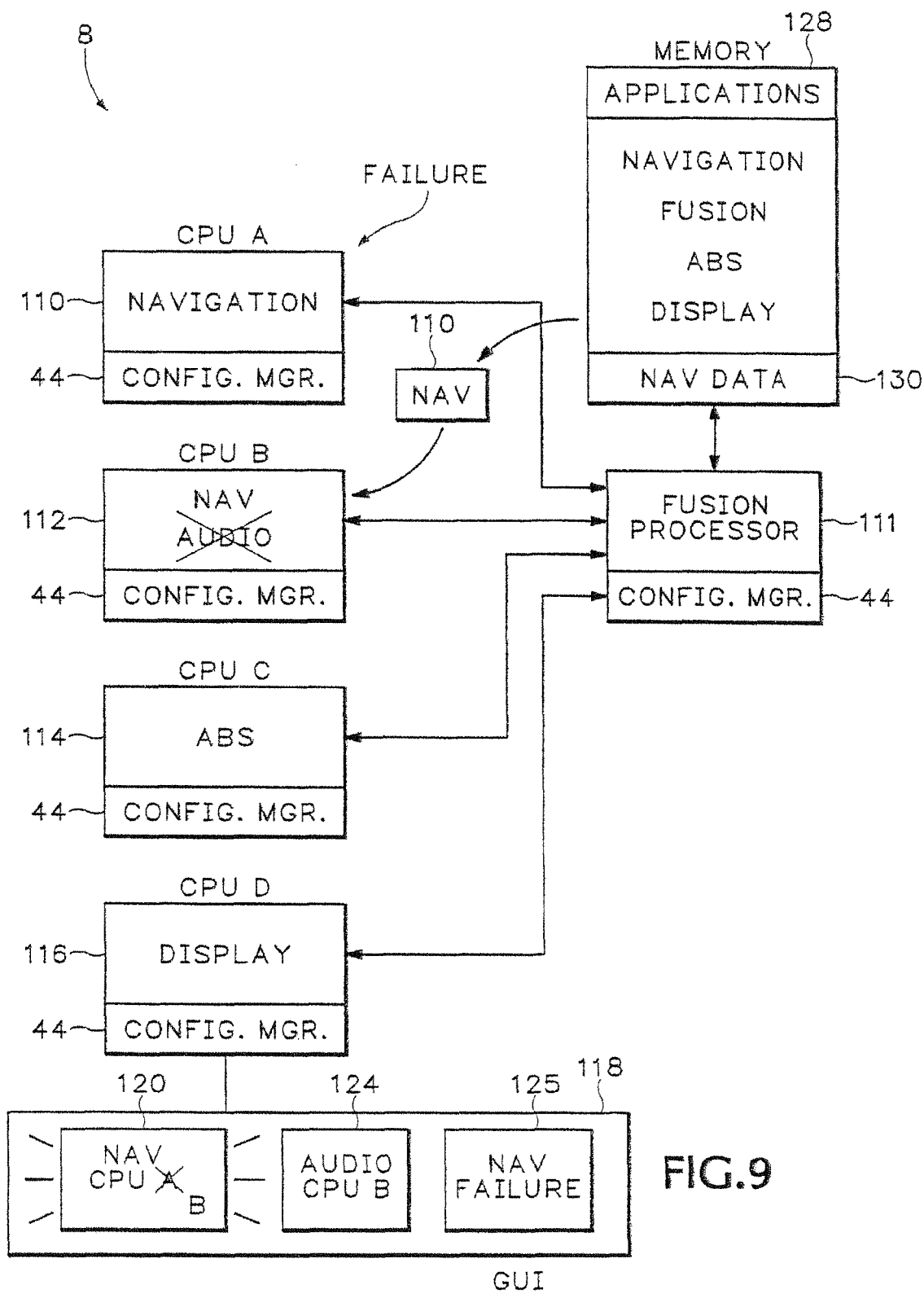
Figure 10:
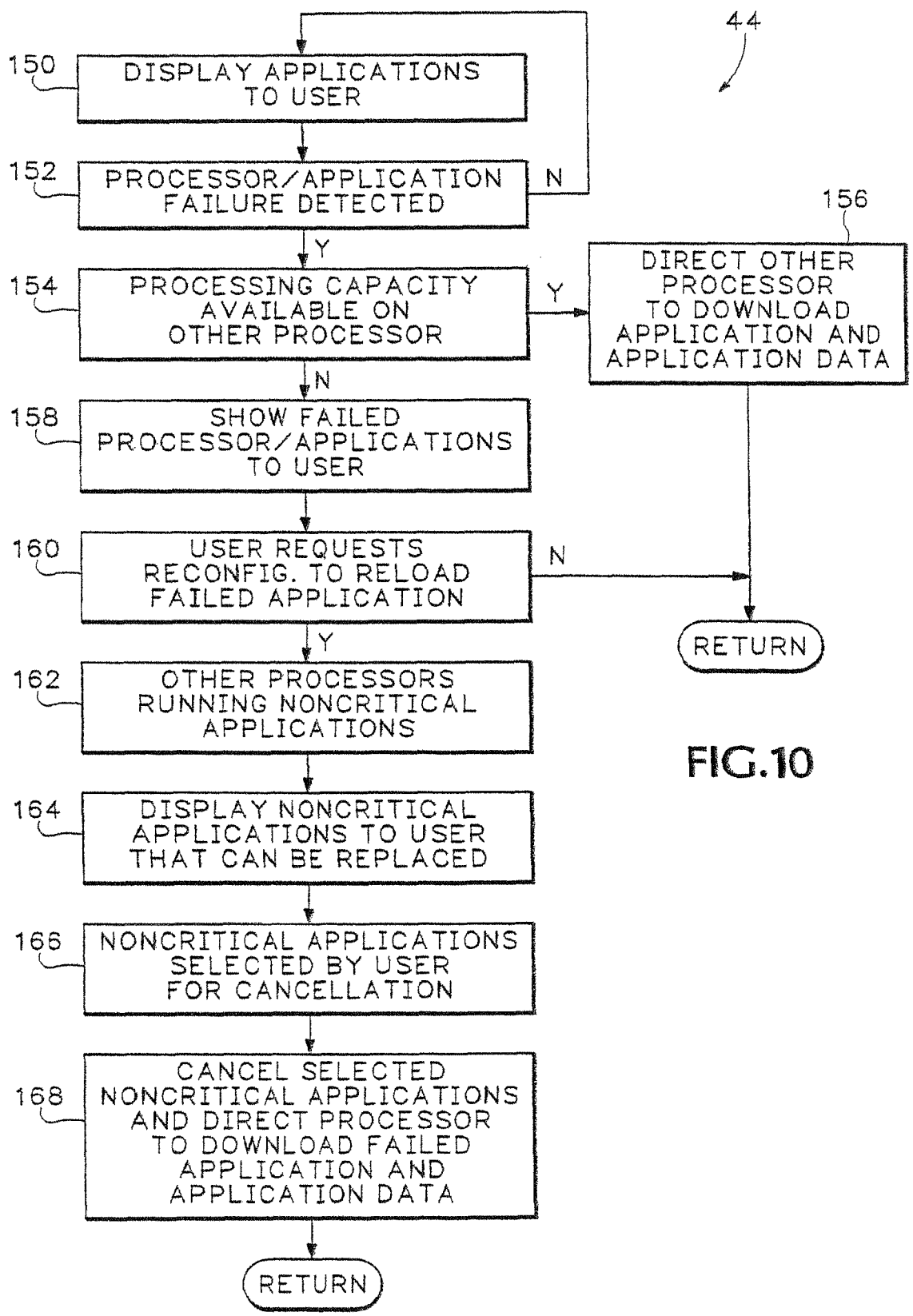

FIGS. 9 and 10 show an example of how the configuration manager 44 allows the user to control reconfiguration for non-critical applications. The applications currently running in the multiprocessor system 8 are displayed in the GUI 118 in block 150. A failure is detected for the navigation application 110 running in processor A in block 152. The configuration manager 44 in processor A, or in one of the other processors B, C, or D detects the navigation failure. Alternatively, a fusion processor 111 is coupled to some or all of the processors A, B, C and D and detects the navigation failure.

In block 154 the configuration manager 44 for one of the processors determines if there is extra capacity in one of the other processors for running the failed navigation application 110. If there is another processor with extra processing capacity, the navigation application is downloaded from memory 128 to that processor with extra capacity along with any necessary navigation data in block 156. This reconfiguration may be done automatically without any interaction with the car operator.

If there is no extra processing capacity for running the navigation application 110, the configuration manager 44 displays the failed processor or application to the user in block 158. For example, the GUI 118 in FIG. 9 starts blinking the navigation icon 120 in possibly a different color than the audio application icon 124. A textual failure message 125 can also be displayed on GUI 118.

The configuration manager in block 160 waits for the car operator to request reconfiguration of the failed navigation application to another processor. If there is no user request, the configuration managers return to monitoring for other failures. If the user requests reconfiguration, the configuration manager 44 in block 164 displays other non-critical applications to the user. For example, the GUI 118 only displays the audio application icon 124 in processor B and not the ABS application icon 122 (FIG. 7). This is because the audio application is a non-critical application and the ABS application 114 is a critical application that cannot be cancelled.

If the car operator selects the audio icon 124 in block 166, the configuration manager in block 168 cancels the audio application 112 in processor B and downloads the navigation application 110 from memory 128 into processor B. A logging manager in processor A may have labeled certain navigation data for logging. That navigation data 130 may include the last few minutes of position data for the car while the navigation application 110 was running in processor A. The logged navigation data 130 is downloaded from memory 128 along with the navigation application 110 into processor B. The navigation icon 120 in GUI 118 then shows the navigation application 110 running on processor B. At the same time the audio application icon 124 is removed from GUI 118.

Referring back to FIG. 2, a processor or application is accepted into the multiprocessor system by one or more of the device managers 46. The configuration managers 44 in the processors reconfigure the multiprocessor system to incorporate the processor or application. The data manager 42 then detects what type of data is transmitted or received by the new device and determines the different processors and input/output devices in the multiprocessor system that can receive or transmit data to the new application or processor.

Figure 11:
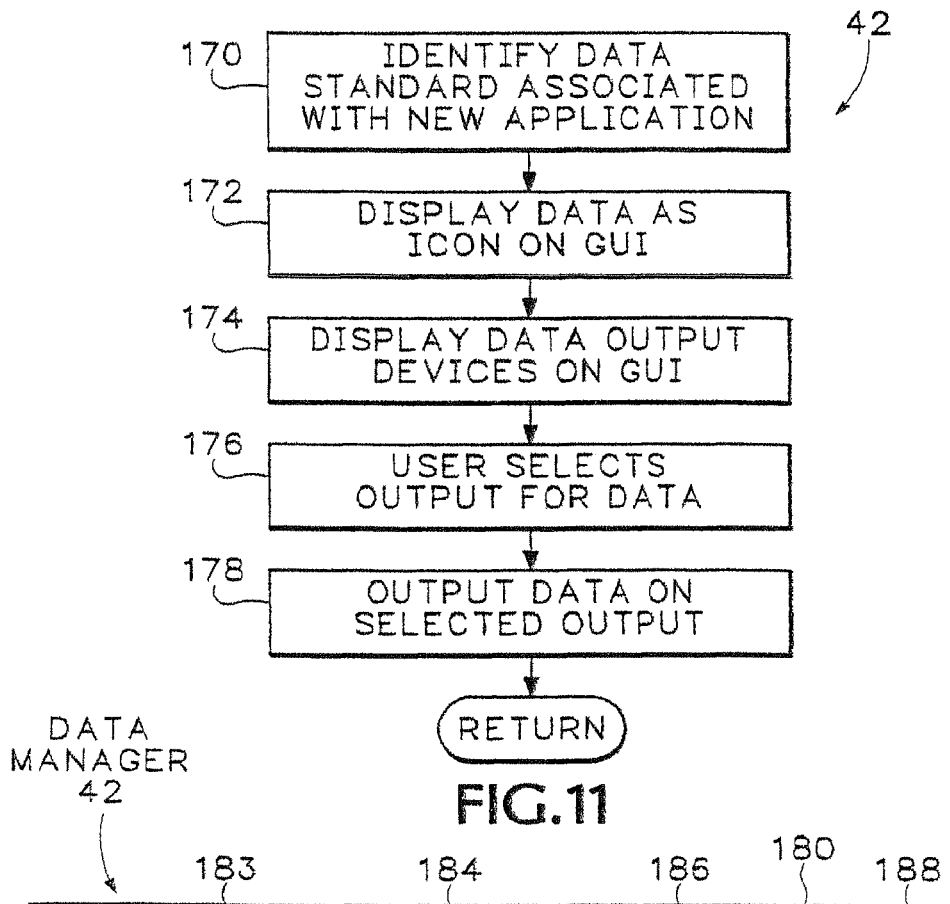
FIGS. 11 and 12 are diagrams showing how a data manager in the DC system operates.

FIG. 11 shows in further detail how the data manager 42 in FIG. 2 operates. In block 170, the data manager for one of the processors determines the data standard for the data that is either transmitted or received by a new device. For example, the new device may be a MP3 player that outputs streaming audio data. In another example, the new device may be a DVD player that outputs streaming video data in a MPEG format.

One or more of the data managers 42, identifies the device by its data and the data, if applicable, is displayed on the graphical user interface in block 172. The data manager then identifies any devices in the multiprocessor system that can output or transmit data to the new device in block 174. For example, a newly detected audio source may be output from a car speaker. The data manager monitors for any user selections in block 176. For example, the car operator may select the output from a portable CD player to be output from the car speakers. The data manager controlling the CD player and the data manager controlling the car speakers then direct the output from the CD player to the car speakers in block 178.

Figure 12:
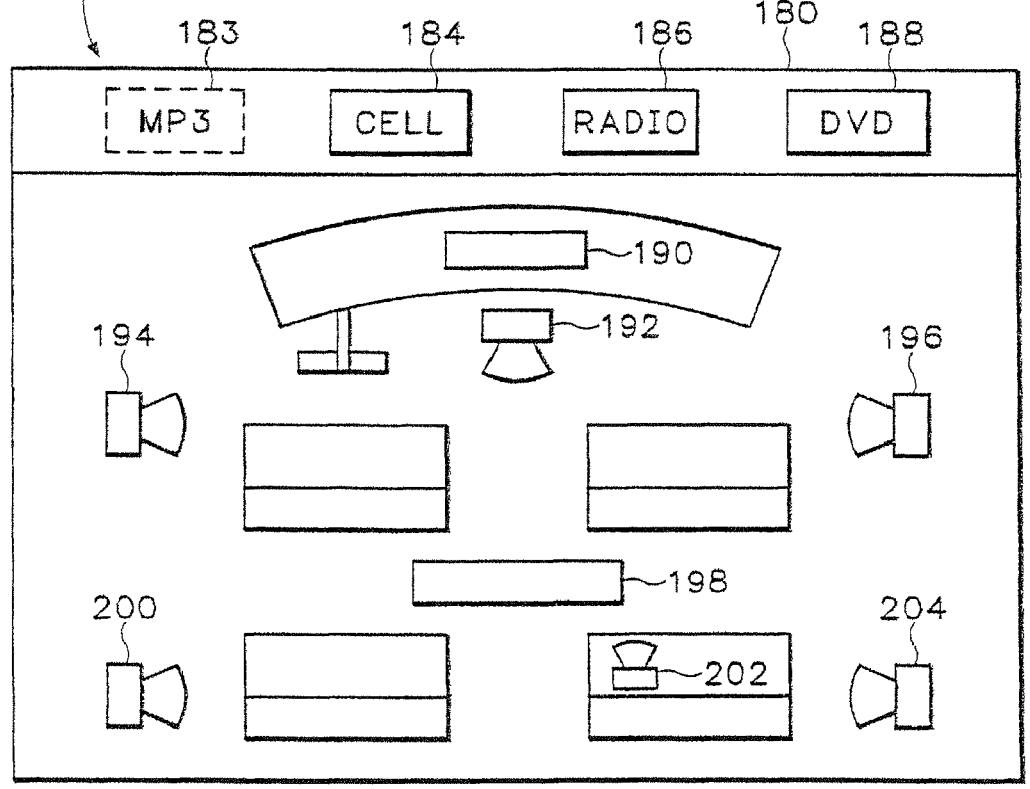

FIG. 12 gives one example of how the data managers 42 in the multiprocessing system operate. A GUI 180 displays the audio or video (A/V) sources in a car. For example, there are three devices detected in or around the car that are A/V sources. A cellular telephone detected in the car is represented by icon 184, a radio is represented by icon 186, and a DVD player is represented by icon 188.

The A/V output devices in the car are shown in the lower portion of GUI 180. For example, icons 192, 194, 196, 200, and 204 show car audio speakers. An in-dash video display is represented by icon 190 and a portable monitor is represented by icon 198.

Currently, a car operator may be listening to the radio 186 over speakers 192, 194, 196, 200 and 204. However, a passenger may move into the backseat of the car carrying an MP3 player. The MP3 player runs the DC system 10 described in FIG. 2 and sends out a signal to any other processors in the multiprocessor system 8 in the car. The device manager 46 and configuration manager 44 in one of the processors verify the data format for the MP3 player and configure the MP3 player into the multiprocessor system.

One of the data managers 42 determines the MP3 player outputs a MP3 audio stream and accordingly generates the icon 182 on the GUI 180. The data manager 42 also identifies a speaker in the MP3 player as a new output source and displays the speaker as icon 202. The car operator sees the MP3 icon 182 now displayed on GUI 180. The car operator can move the MP3 icon 182 over any combination of the speaker icons 192, 194, 196, 200 and 204. The output from the MP3 player is then connected to the selected audio outputs.

Audio data can also be moved in the opposite direction. The speaker icon 202 represents the output of the portable. MP3 player that the passenger brought into the backseat of the car. The car operator also has the option of moving one or more of the other audio sources, such as the cellular telephone 184 or the radio 186 icons over the speaker icon 202. If the car operator, for example, moves the radio icon 186 over the MP3 player speaker icon 202 and the MP3 player can output the radio signals, the multiprocessor system redirects the radio broadcast out over the MP3 speaker.

Figure 13:
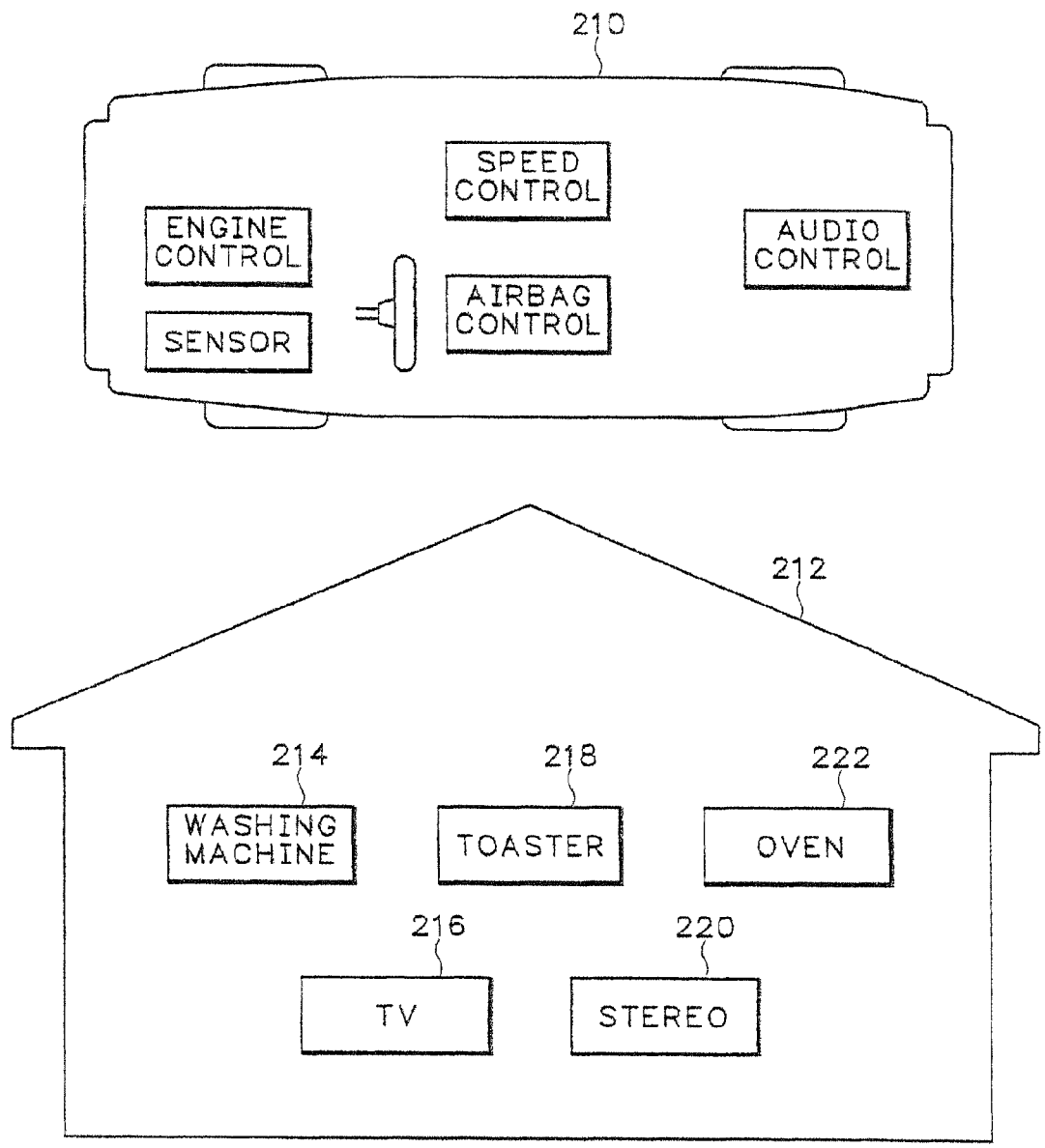
FIG. 13 is a diagram showing different multiprocessor systems that can use the DC DC system.

It should be understood that the multiprocessor system described, above could be used in applications other than cars. For example, FIG. 13 shows a first GUI 210 that shows different processors and applications that are coupled together using the DC system 10 in an automobile. A GUI 212 shows another multiprocessor system comprising multiple processors in the home. For example, a washing machine is shown by icon 214. The DC system allows the washing machine processor to communicate and be configured with a television processor 216, toaster processor 218, stereo processor 220, and an oven processor 222.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention ay be modified in arrangement and detail without departing from such principles. Claim is made to all modifications and variation coming within the spirit and scope of the following claims.

The invention claimed is:

1. An apparatus, comprising:
    a speed sensor configured to generate speed data for a vehicle;
    a multiprocessor system located within the vehicle and coupled to the speed sensor, wherein the multiprocessor system comprises multiple different processors controlling different functions within the vehicle, wherein the multiprocessor system is configured to:
    identify a processor operating in a new device not currently configured as part of the multiprocessor system;
    identify a speed of the vehicle based on the speed data generated from the speed sensor;
    initiate a connection with the new device, take over operation of an application for the new device, and exchange data with the new device based on the speed of the vehicle; and
    operate a security manager, wherein the security manager is configured to:
    identify a security attribute associated with the new device;
    identify the new device as authorized or unauthorized according to the security attribute;
    allow connection of the new device to the multiprocessor system in response to the new device being identified as authorized; and
    prevent connection of the new device to the multiprocessor system in response to the new device being identified as unauthorized.

2. The apparatus of claim 1 wherein the new device comprises a mobile device brought into or next to the vehicle.

3. The apparatus of claim 1 wherein the new device comprises a cellular telephone.

4. The apparatus of claim 1 wherein the multiprocessor system connects to the new device via a Bluetooth connection.

5. The apparatus of claim 1 wherein the multiprocessing system is further configured to:
    detect a hazardous condition based on the speed of the vehicle; and
    control the connection and the exchange of data with the new device based on the hazardous condition.

6. A method, comprising:
    controlling operations in a vehicle with an in-vehicle processing system;
    detecting a mobile device not currently connected to the in-vehicle processing system moving into or next to the vehicle;
    monitoring a speed of the vehicle with the in-vehicle processing system;
    establishing a connection between the in-vehicle processing system and the mobile device based on the speed of the vehicle;
    configuring the in-vehicle processing system and the mobile device to exchange responsibilities for processing data based on the speed of the vehicle;
    exchanging data between the in-vehicle processing system and the mobile device based on the speed of the vehicle;
    identifying a security attribute associated with the mobile device;
    identify the mobile device as authorized or unauthorized according to the security attribute;
    allowing the connection between the mobile device and the in-vehicle processing system in response to the mobile device being identified as authorized; and
    preventing the connection between the mobile device and the in-vehicle processing system in response to the mobile device being identified as unauthorized.

7. The method of claim 6 wherein the mobile device comprises a mobile phone brought into or next to the vehicle.

8. The method of claim 6 wherein the mobile device comprises a personal computer.

9. The method of claim 6 wherein the in-vehicle processing system connects to the mobile device via a Bluetooth connection.

10. The method of claim 6 wherein the in-vehicle processing system is further configured to:
    detect a hazardous condition based on the speed of the vehicle; and
    enable the connection and the exchange of data with the mobile device based on the hazardous condition.

11. An apparatus, comprising:
    a multi-processor system comprising multiple processors located in or next to a vehicle and configured to control different operations within the vehicle, wherein the multi-processor system is further configured to:
    enable a first one of the multiple processors to run an application within the vehicle;
    monitor a speed of the vehicle;
    compare the speed of the vehicle with a speed threshold value;
    disable the first one of the multiple processors from running the application within the vehicle in response to detecting the speed of the vehicle exceeding the speed threshold value, wherein a second one of the multiple processors is configured to run the application instead of the first one of the multiple processors; and operate a security manager, wherein the security manager is configured to:
    identify a security attribute associated with the second one of the multiple processors;
    identify the second one of the multiple processors as authorized or unauthorized according to the security attribute;
    allow connection of the second one of the multiple processors with the multiprocessor system in response to the second one of the multiple processors being identified as authorized; and
    prevent connection of the second one of the multiple processors to the multiprocessor system in response to the second one of the multiple processors being identified as unauthorized.

12. The apparatus of claim 11 wherein the second one of the multiple processors comprises a mobile device brought into or next to the vehicle.

13. The apparatus of claim 11 wherein the second one of the multiple processors comprises a cellular telephone.

14. The apparatus of claim 11 wherein the multiprocessor system connects to the second one of the multiple processors via a Bluetooth connection.

15. The apparatus of claim 11 wherein the multiprocessing system is further configured to:
    detect a hazardous condition based on the speed of the vehicle exceeding the speed threshold; and
    control a connection and the exchange of data between the first one of the multiple processors and the second one of the multiple processors based on the hazardous condition.

* * * * *